United States Patent Office 2,996,482
Patented Aug. 15, 1961

2,996,482
POLYPIPERAZINE ADIPAMIDES HAVING HIGH INHERENT VISCOSITY
Robert Eyer Albert, Newark, Del., and William George Vosburgh, West Chester, Pa., assignors to E. I. du Pont de Nemours and Company, Wilmington, Del., a corporation of Delaware
No Drawing. Filed July 21, 1958, Ser. No. 749,615
2 Claims. (Cl. 260—78)

The present invention relates to a high molecular weight, soluble, high melting polymer from piperazine and adipyl chloride. More particularly, it concerns fibers and films from poly(piperazine adipamide).

Poly(piperazine adipamide) mentioned in the literature has been described as deficient in fiber-forming properties. Lieser, Gehlen, and Gehlen-Keller report in Liebig's Annalen der Chemie, volume 556, pages 114–26, in 1944 that poly(piperazine adipamide), made by melt polymerization of the piperazonium adipate salt, is high melting and insoluble, but is not fiber-forming. Aelion, Annales de Chimie (Paris), volume 3, pages 5–61, in 1948 reports that heating of piperazonium adipate salt in a vacuum with a large excess of piperazine produces a polymer of low melting point (185° C.).

It is an object of the present invention to provide a high molecular weight, high melting (i.e., melting above 300° C.), soluble fiber-forming polyamide. Another object is to provide fibers and films with resistance to high temperature exposure. It also is an object of this invention to provide a solution of a fiber-forming piperazine adipamide polymer. A still other object is the provision of a post-moldable piperazine polyamide.

These and other objects are accomplished by interfacial polymerization of adipyl chloride with piperazine. There results a fiber-forming, high melting polyamide of the following recurring structural unit:

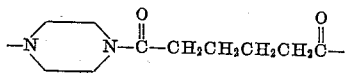

By the term "interfacial polymerization" is meant a condensation polymerization in which the two reactants are dissolved independently in two non-miscible liquids. The polymerization is characterized by its high speed and simplicity, and by the fact that it does not require expensive apparatus or excessive heat. In accordance with the invention, a polymer has "high molecular weight" when its inherent viscosity is at least about 1.0 as measured in 1,1,2,2-tetrachloroethane/phenol (40/60) at a concentration of 0.5%. The inherent viscosity data given herein was determined on that basis.

The new polymer is a polyamide similar to 66-nylon, since it also derives from adipic acid. However, it possesses unusual and desirable properties which are unpredictable for a polymer of this type. Thus, it demonstrates better light stability and much better high temperature resistance than nylon. Moreover, polymers of this invention having an inherent viscosity above about 1.8 are post-formable. By this is meant that fibers, films, or fabrics made of the polymer can be formed into any desired shape without the necessity of employing high temperatures or pressures or both, by simply wrapping them in their wet state around an object to which shape it will adapt upon drying. This characteristic is of immense commercial interest and has not been observed in any other polyamide to date.

By "soluble fiber-forming polyamide" is meant that the polyamide is soluble in a conventional spinning solvent. For the purposes of the invention, the polymer is soluble if at least 5% of the polymer dissolves in formic acid at room temperature. The polymers of the invention dissolve however to a much greater extent. The lower limit of solubility is significant since it delineates solutions suitable for practical utilization from those which are not.

The following examples are merely illustrative of the present invention and are not limiting.

EXAMPLE I

A mixture of 3.1 grams (0.036 mol) of piperazine and 6.36 grams (0.06 mol) of sodium carbonate is dissolved in 150 cc. of water in a Waring Blendor. An emulsion is preformed by adding 75 cc. of chloroform while stirring. A solution of 5.49 grams (0.03 mol) of adipyl chloride in 50 cc. of chloroform is added over a period of 1 to 2 seconds. Stirring is continued for 7 minutes and the chloroform is then removed by evaporation on a steam bath. The polymer is separated by filtration and washed successively in a Waring Blendor with two 500 cc. portions of acetone, two 500 cc. portions of boiling distilled water, and one 500 cc. portion of acetone. The resulting polymer is dried at 70° C. in a vacuum oven overnight. The inherent viscosity is 1.16, and the polymer is soluble in m-cresol and formic acid. The yield is 4.2 g. or 72% of a white polymer which is very stable since its solution in m-cresol at 100° C. shows no sign of degradation after 2 hours.

The piperazine, used in this example, is purified as follows: hexahydrated piperazine is recrystallized twice from water, redissolved in distilled water, and passed as solution through a 15 inch column containing "Amberlite MB–3," an ion exchange resin marketed by Rohm & Haas Co. The chloroform used in this example is purified by washing it with concentrated sulfuric acid, followed by washings with water until the acid can no longer be detected in this wash liquid, and drying over calcium hydride. The adipyl chloride used is purified by fast distillation.

EXAMPLES II–XII

In the following examples, Example I is repeated with variations only in solvents, solvent amounts, or purification methods for the monomers. Unless otherwise indicated, the monomers are purified according to Example I.

Table 1

| Example Number | Aqueous Phase, cc. | Total Organic Solvent | Yield | Color | Inherent Viscosity |
|---|---|---|---|---|---|
| II | 150 | 125 cc. CCl₄ | 2.4 g.; 41% | Tan | 1.13 |
| III | 75 | 62.5 cc. CCl₄ | 2.6 g.; 44% | Grey | 1.18 |
| IV | 150 | 125 cc. C₆H₅NO₂ | 4.3 g.; 73% | Tan | 1.26 |
| V | 150 | 125 cc. C₆H₅NO₂ | 4.4 g.; 75% | Tan | 1.41 |
| VI | 150 | 125 cc. C₆H₅NO₂ | 3.5 g.; 60% | Tan | 1.18 |
| VII | 225 | 50 cc. C₆H₅NO₂ | 6.4 g.; 64% | Tan | 1.24 |
| VIII | 150 | 125 cc. CHCl₃ | 3.6 g.; 61% | White | 1.13 |
| IX | 110 | 125 cc. C₆H₅NO₂ | 4.2 g.; 72% | Tan | 1.42 |
| X | 100 | 125 cc. CHCl₃ | 3.3 g.; 50% | White | 1.50 |
| XI | 100 | 125 cc. CHCl₃ | 4.0 g.; 68% | White | 1.61 |
| XII | 120 | 125 cc. CHCl₃ | 4.2 g.; 71% | White | 1.25 |

In Examples IV–VII and IX, the water in the aqueous phase is saturated with sodium chloride. In Example VI, the sodium carbonate is replaced by an excess of 4.0 g. piperazine as acid binder. In Examples II–VIII, the piperazine is purified as in Example I, whereas in Examples IX–XII the purification for the monomer is as follows: in Examples IX and X, piperazine hexahydrate is recrystallized twice from water and redissolved in distilled water; in Example XI this solution is further purified by passing it through a 15 inch column of "Amberlite MB–3"; in Example XII, anhydrous piperazine is dissolved in methylenechloride and the solution run through silica gel. In addition, the adipyl chloride used in Examples X–XII is distilled shortly before use, whereas in Examples I–IX, this monomer had been distilled some time before use.

EXAMPLE XIII 3 g. of poly(piperazine adipamide) of inherent viscosity 1.32 is dissolved in 12 g. formic acid at room temperature to give a light tan, viscous, clear solution. A film is cast onto a glass plate with a 0.01 inch doctor knife. The film is dried over night in an air stream at room temperature and then removed from the glass plate with warm water of about 40° C. The white tough film is drawn over a pin to 3.3–4.7X at 285–305° C. The resulting film shows no sign of shrinking in boiling water.

The concentration of the solution for film formation is not critical. A practical range of concentrations lies within the limits of about 8% and 35%. Above 35%, the solutions tend to be too viscous for easy handling if the polymer is of sufficiently high molecular weight.

EXAMPLE XIV

Spinning solutions of poly(piperazine adipamide) are prepared by dissolving the polymer in anhydrous formic acid at room temperature to form a solution containing 33% solids. Such a solution is very viscous, but after heating it for 1½ hours at 76° C., a 90% drop in solution viscosity is observed. For this reason the spinning head in conventional dry spinning equipment is preferably maintained at elevated temperature.

A polymer made by the method of Example XII having an inherent viscosity of 1.35 and a melting point of 350° C., is dissolved in 99.6% pure formic acid to a solution containing 33% poly(piperazine adipamide). A conventional dry spinning apparatus with a 3 hole spinneret is used with the following settings:

| | |
|---|---|
| Head temperature ° C | 50 |
| Head pressure p.s.i. | 165–180 |
| Pump speed cc./min. | 1.75–1.5 |
| Orifice diameter mm. | 0.10 |
| Column temperature ° C. | 180–188 |
| Wind-up speed y.p.m. | 130 |
| Spin stretch factor | 1.75–2.0 |

The following table gives the stress-strain properties. The columns marked "boiled-off" list the characteristics measured after relaxed boil-off.

*Table II*

DRAW RATIO/DRAW TEMPERATURE

| Properties | 3.5/150 | | 4/220 | | 4/280 | |
|---|---|---|---|---|---|---|
| | As Drawn | Boiled Off | As Drawn | Boiled Off | As Drawn | Boiled Off |
| Tenacity, g.p.d. | 2.5 | 2.2 | 3.8 | 3.1 | 2.9 | 2.4 |
| Elongation, percent | 26 | 46 | 17 | 24 | 18 | 23 |
| Initial Modulus, g.p.d. | 30 | 20 | 44 | 17 | 44 | 17 |
| Filament Per Denier | 5.8 | 6.9 | 5.1 | 5.3 | 4.4 | 4.8 |

The yarn exhibits the following properties as measured on a Suter Tester on a 12 filament yarn drawn 3.7X at 220° C.:

| | |
|---|---|
| Tenacity | 4.1 |
| Elongation | 12 |
| Knot tenacity vs. tenacity | 0.93 |
| Knot elongation vs. elongation | 0.87 |
| Loop tenacity vs. tenacity | 0.73 |
| Loop elongation vs. elongation | 0.67 |
| Fiber stick temperature ° C. | 307 |
| Zero strength temperature ° C. | 375 |
| Shrinkage on Boil-off | 10 to 15° |
| Yarn cross section | "Kidney like" |

EXAMPLE XV

A mixture of 78 cc. of a 1 molar piperazine solution (8.6%) in water, 60 cc. of a 2 molar sodium carbonate solution (21.2%), and 162 cc. distilled water is agitated in a Waring Blendor. A solution of 6.6 cc. freshly distilled adipyl chloride in 150 cc. chloroform (washed free of alcohol with water and dried over calcium hydride) is added quickly in one portion. The polymer immediately precipitates, is broken up, and further stirred for four to five minutes. The slurry is filtered in a Buechner funnel, reslurried in the Waring Blendor, with water, heated on a steam bath to remove the last traces of solvent, filtered off in a Buechner funnel, thoroughly washed, and dried in a vacuum oven at 70° C. A yield of 67% of colorless polymer of inherent viscosity 2.11 is obtained.

A combination of polymer from several batches is dissolved in formic acid to a solution containing 32% polymer. A yarn spun from this solution according to Example XIV is tested for light-stability in a Fade-Ometer by winding several turns of the yarn around a flat piece of cardboard. After 20 exposure hours, stress/strain tests show no loss in tenacity, elongation, and initial modulus. After extending this Fade-Ometer test to 106 hours, tenacity, elongation, and initial modulus of exposed portions of the yarn are found identical with the non-exposed portions although slightly below the original yarn properties.

EXAMPLE XVI

Poly(piperazine adipamide) of inherent viscosity 2.0 is dissolved by adding 10 parts of the finely divided polymer to 30 parts of anhydrous formic acid while stirring it at room temperature with a high speed disc impeller driven by an air motor. Complete dissolution is effected in about 1 hour. Immediately before spinning, the solution is degassed by attaching the vessel to a 3–4 inch mercury pressure line until nucleation of bubbles ceases. Although small batches do not need filtration, this batch is filtered through a two-stage plate and frame press consisting of the following filter elements: Canton flannel, cotton batt, balloon cloth, and two table felts. A spin is performed through conventional dry spinning equipment with a 10 hole spinneret with orifice diameters of 4 mils. The solution temperature is 80–82° C.; the cell is kept at 100–190° C. with 5 c.f.m. of aspiration air at 200° C. Under these conditions, a 150 denier yarn is obtained which contains about 10% solvent at the bottom of the cell.

These conditions produce excellent initial jetting and spinning performance. The pack pressure does not increase beyond operability in a 5 hour spin. The spinneret pack assembly consists of a 1½ inch diameter acetate protrusion type spinneret with the following pack elements listed in order: two 200 mesh screens, a 50 mesh screen, a balloon cloth, and a table felt, topped by a 20 mesh screen which serves to hold the elements in place. The filaments are converged at the bottom of the cell and withdrawn over a finishing roll at 120 to 150 y.p.m. A non-aqueous finish is applied to the as-spun yarn to reduce static charges and aid in drawing. In drawing, best results are obtained with a pin at 250° C. and a draw ratio of 5.0X. Under these conditions maximum tenacity and dimensional stability is obtained.

EXAMPLE XVII

Fibers made from poly(piperazine adipamide) according to Example XV and with an inherent viscosity of 2.2 is tested for its wet shapeability. These fibers are first drawn dry, and subsequently wet stretched. The following tables list the properties for dry fibers (Table III), and wet (Table IV) fibers, in which the drawn fibers are wet stretched and dried taut.

Table III

| Draw Ratio (Before wet stretching) | 1.0 | 2.0 | 3.0 | 4.0 | 5.0 |
|---|---|---|---|---|---|
| Tenacity, g.p.d | 1.2 | 1.5 | 1.9 | 2.9 | 3.9 |
| Elongation, percent | 165 | 54 | 50 | 25 | 15 |
| Initial Modulus, g.p.d | 9.5 | 16.5 | 21 | 24 | 30 |

Table IV

| Draw Ratio (Before wet stretching) | 1.0 | 2.0 | 3.0 | 4.0 | 5.0 |
|---|---|---|---|---|---|
| Wet Stretch, percent | 265 | 140 | 50 | 30 | 15 |
| Tenacity, g.p.d | 0.5 | 0.7 | 1.4 | 2.1 | 3.0 |
| Elongation, percent | 165 | 84 | 53 | 22.5 | 19 |
| Initial Modulus, g.p.d | 1.0 | 2.0 | 3.5 | 8.6 | 10.1 |
| Wet Stretchability, percent | 125 | 88 | 66 | 19 | 18 |
| Permanent Deformation, percent | 47 | 43 | 33 | 6 | 6 |

The above tables demonstrate the outstanding wet moldability of the fibers from the polymer of the present invention. The wet stretchability (elasticity) of fibers drawn dry prior to the wet stretching is not completely recoverable.

As a further illustration, a fiber drawn 2X has a dry tenacity of 1.1 g.p.d. and a dry modulus of 12 g.p.d. It can be wet stretched 140%, and if dried at this extension, the fiber will then exhibit a dry tenacity of 1.5 g.p.d. and a dry modulus of 17 g.p.d. The additional orientation brought about by wet stretching has not, however, increased the wet modulus, this value being about 4 grams per denier for the as-drawn fiber and also for the as-drawn, wet stretched and dried taut fiber. This wet stretched and dried taut fiber then exhibits a wet stretchability of about 75% with a permanent deformation of about 25%.

The process of the present invention can be varied within wide limitations, as shown in detail in the examples. The foregoing examples demonstrate a number of variations in the process to obtain poly(piperazine adipamide) of high molecular weight which is fiber-forming, soluble, and high melting. This is very surprising since the prior art states that poly(piperazine adipamide) is either low melting or insoluble and non-fiber-forming. Thus, the present process is the only one to yield a high molecular weight, high melting, soluble polymer capable of forming fibers of high tenacity, low elongation, and having a light stability better than that of 66-nylon. The fibers made from this polymer have good to excellent transverse properties and good dry properties as hard fibers while exhibiting elastomer properties when wet and before setting.

In general, the purity of the reactants is not critical for the preparation of polymers and monomers can be used as commercially available. However, for the preparation of fiber-forming polymers of the invention, it is essential to purify adipyl chloride such as by distillation before use and to purify the piperazine such as by recrystallizing, redissolving, and filtering the piperazine solution through "Amberlite" or silica gel.

As seen in the examples, various amounts of solvents can be used for the two phases of the interfacial polymerization, e.g., the aqueous phase can vary in concentration between about 0.05 to about 1.0 mol/l. and the liquid can be water or a salt solution. The adipyl chloride solution also can vary in concentration from about 0.05 to 0.5 mol/l. based on the total of organic solvent used. The best results are obtained by having both reactants dissolved in their respective solvents at a concentration of about 0.2 mol/l., although the ratio between piperazine solvents to adipyl chloride solvent may be varied from between 7:1 to 1:4.

As stated above, the best interphase reaction is obtained when a portion of the organic solvent with the aqueous piperazine phase is premixed and the adipyl chloride solution in the same organic solvent, subsequently added, although the pre-emulsification is not needed. Inversing the monomer addition sequence has no effect on the reaction.

The organic solvent must be less reactive to either one of the monomers than the monomers are towards each other. Preferably, the solvent is water-immiscible, although certain water-soluble organic solvents for the diacid chloride may give satisfactory polymers in respect to molecular weight and yield. Among the useful solvents for the adipyl chloride are methylene chloride, chloroform, carbon tetrachloride, benzene, nitrobenzene( chlorobenzene, 1,1,2 - trichloroethane, dioxane, 1,1,2,2 - tetrachloroethane, trichloroethylene, 1,2,3-trichloropropane, or mixtures thereof.

The condensation polymerization is preferably performed in the presence of an acid binder, since hydrochloric acid forms in the reaction as a by-product. Sodium carbonate, sodium bicarbonate or triethanolamine or an excess of piperazine, all are suitable. Other alkalies or alkaline salts can also be used. It is preferred to use an excess of piperazine above the equimolar amount regardless of acid-binder and such excess, although not required, may be as large as 30–50%.

The interfacial polymerization can be carried out within a wide range of temperatures. No advantage is seen in using heating or cooling equipment, since the reaction proceeds almost instantaneously at room temperature to form a satisfactory polymer. Also no advantage is seen in adding an emulsifier or a wetting agent, since any such agents only tend to cause impurities in the final polymer apparent in discoloration or melting point depression. However, vigorous stirring during the polymerization is recommended to assure intimate mixing of the two phases, thus multiplying the reaction surface manyfold.

The polymer of the present invention also lends itself to copolymerizations. Replacing up to 10% of one of the monomers by another compound having the same functional groups with about the same or even better reactivity produces copolymers of slightly increased molecular weight but with practically no difference in physical properties over the homopolymer.

Maximum physical properties are developed in the fibers by drawing them over a pin at 250° C. to 5 times their as-spun length. The tenacity drops sharply at higher drawing temperatures, although slightly higher draw ratios could be obtained. Drawing below about 200° results in poor dimensional stability. Obviously, polymers with lower molecular weight are less desirable for the development of high physical properties by drawing. Polymers having an inherent viscosity above about 1.0 can be used for the production of high tenacity fibers. For fibers with good tensile properties, good wet elasticity and postformability, inherent viscosities above about 1.8 are desirable.

The fibers of the polymer of the present invention are very well suited for the manufacturing of clothing. The fabrics have a soft hand and can be dyed to any color desired. Poly(piperazine adipamide) fibers are also suited for technical uses wherever strength, high temperature resistance and/or light-stability is required. For example, they can be used in uniforms for operators in high temperature areas as in steel mills or near coke ovens. In addition they can be used for insulating purposes, press pad covers, coatings on wires, glass, etc. Crystallized films made by casting the polymer and drawing them are well suited for the motion picture industry because of their temperature resistance, toughness, flexibility, and transparency.

Blends of the novel fibers with cellulosic fibers or with synthetic fibers such as other polyamides, polyacrylonitriles, poly(vinyl compounds), polyesters, polyureas, polyurethanes, polysulfonamides, polyethers, polythiolesters, polythioamides, etc., can be used in the production of special novelty fabrics. The use of the fibers in felt-making is also recommended. Felts and fibers made from poly(piperazine adipamide) lend themselves advantageously to clothing, e.g., brassieres, etc., and packaging e.g., wrapping of clothing for storage, food wrapping, etc., because of their outstanding wet-shapeability. The heat resistance of the fibers from high molecular weight poly(piperazine adipamide), as well as the ultra-violet light-stability are exceptionally good for a polyamide. Thus, the tenacity is reduced only to about 60% after exposure of the fibers to air at 150° for 70 hours, and they retain about 58% of their tenacity after 200 exposure hours to ultra-violet light. In comparison, 66-nylon fibers retain only 50% of their original tenacity after such light exposure.

Thus, the polymer of the present invention exhibits a great many highly desirable characteristics which are well recognized by the textile and industrial polymer application trade. It is indeed surprising that the polymer can be obtained in the fiber-forming molecular weight range with the above cited excellent properties such as wet-moldability, high wet- and dry-tenacities, high softening point, and excellent solubility in commonly used spinning solvents.

We claim:
1. A post-formable, high-melting, soluble, fiber-forming polymer having an inherent viscosity of about 2.11 when measured in 1,1,2,2-tetrachloroethane/phenol (40/60) at a concentration of 0.5%, said polymer consisting essentially of the following recurring structural unit

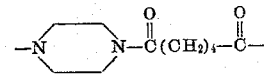

2. A fiber spun from the polymer of claim 1.

References Cited in the file of this patent

UNITED STATES PATENTS

| | | |
|---|---|---|
| 2,813,775 | Steuber | Nov. 19, 1957 |
| 2,831,834 | Magat | Apr. 22, 1958 |

OTHER REFERENCES

Flory et al.: J.A.C.S., vol. 73, pp. 2532–38 (1951).
Leiser et al.: Annalen, vol. 556, pp. 114–26 (1944).